C. L. PECK.
TREATMENT OF SEWAGE.
APPLICATION FILED JULY 31, 1920.
1,392,213.
Patented Sept. 27, 1921.
2 SHEETS—SHEET 1.
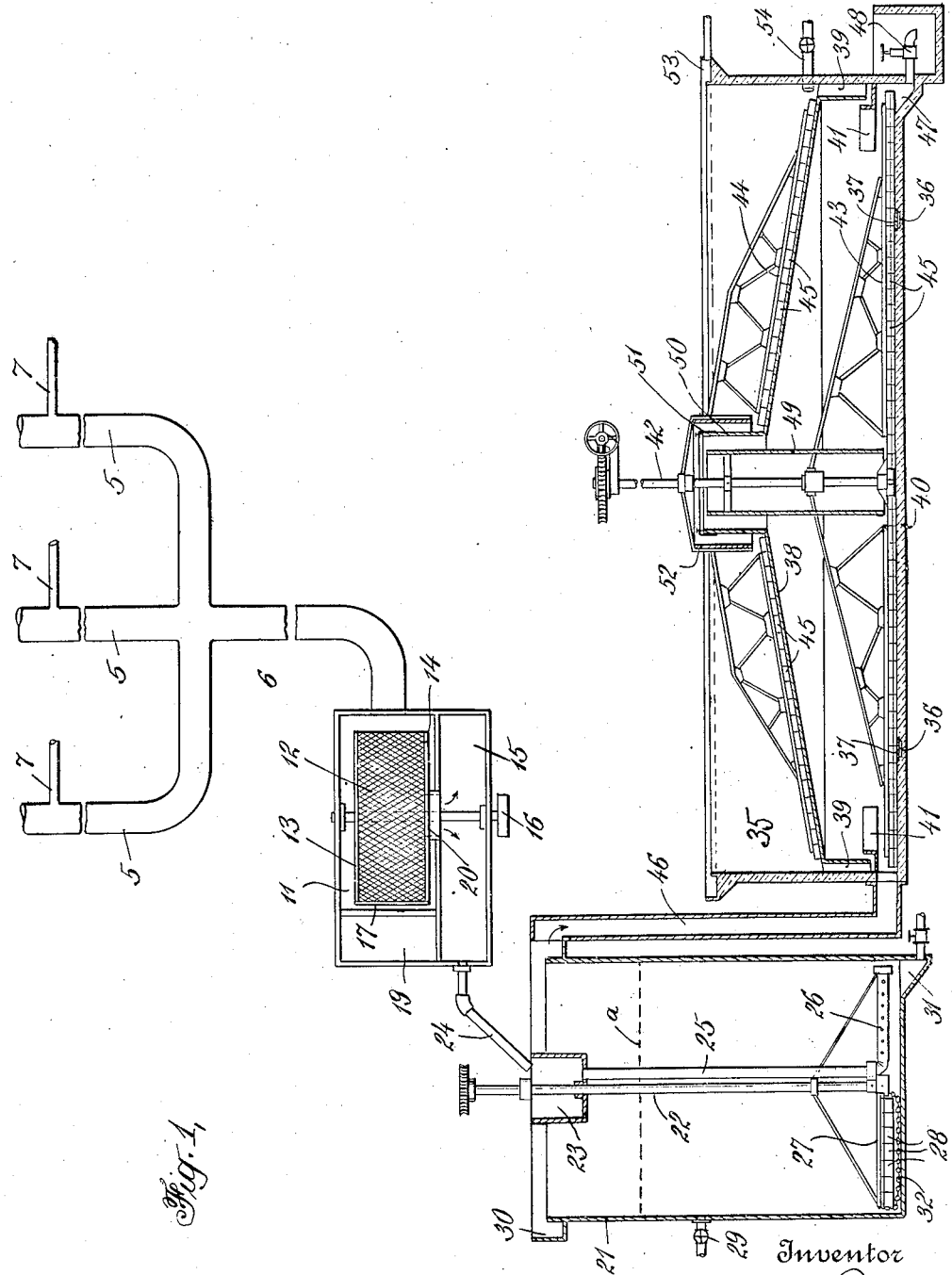

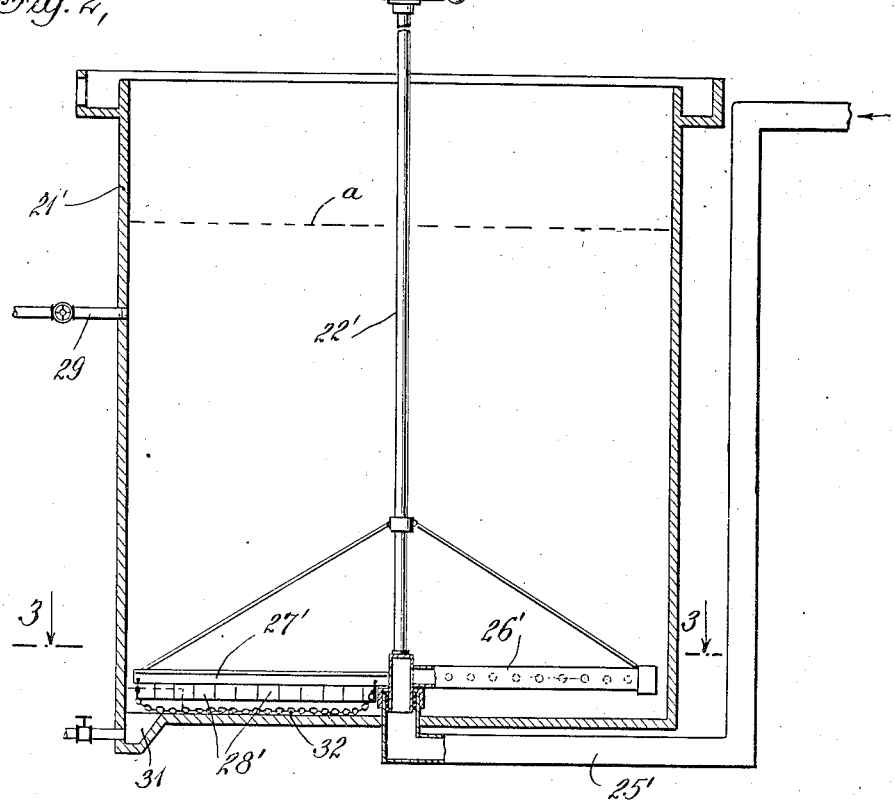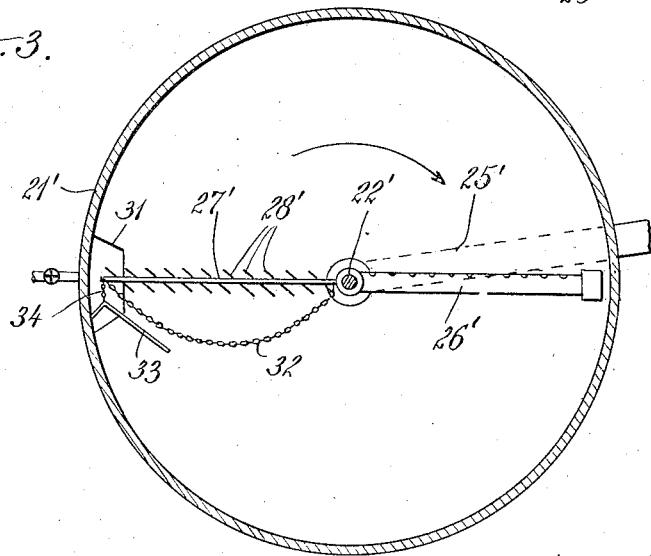

UNITED STATES PATENT OFFICE.

CHARLES LEE PECK, OF NEW YORK, N. Y., ASSIGNOR TO THE DORR COMPANY, A CORPORATION OF DELAWARE.

TREATMENT OF SEWAGE.

1,392,213.     Specification of Letters Patent.      Patented Sept. 27, 1921.

Application filed July 31, 1920. Serial No. 400,480.

*To all whom it may concern:*

Be it known that I, CHARLES LEE PECK, a citizen of the United States, residing at New York city, in the county of New York, State of New York, have invented certain new and useful Improvements in the Treatment of Sewage; and I do hereby declare the following to be a full, clear, and exact description of the invention, such as will enable others skilled in the art to which it appertains to make and use the same.

This invention relates to the treatment of sewage and similar liquors, such, for example, as domestic or municipal sewage, and the like. The invention has for its object the provision of certain improvements in sewage treatment.

The purification or treatment of sewage by biological or bacterial action has, during recent years, been given considerable attention by sanitary engineers. In general, the biological or bacterial action is one of digestion or biological clarification in the course of which appropriate organisms or bacteria are relied upon to convert putrescible organic matter in the sewage into a nonputrescibe or innocuous condition. Anaerobic or aerobic organisms or bacteria may be made use of for this purpose. Thus, in accordance with the so-called septic tank process of sewage treatment, there is maintained, usually by the exclusion of air and light from the sewage, a condition suitable to the growth of anaerobic bacteria, and in the activated sludge process of sewage treatment, there is maintained, usually by forced aeration such as the blowing of air in a fine state of subdivision into the sewage, a condition suitable to the growth of aerobic bacteria.

The method of sewage treatment contemplated by the present invention differs in many respects from either the septic tank or activated sludge processes of purifying sewage, although in certain respects it is in the nature of an activated sludge process. In its complete aspect, the method of the invention involves four principal operations, namely; (1) subjection of the sewage as it flows through the sewer to biological action, induced, where necessary, by the introduction into the sewage as it flows through the sewer of an appropriate stimulant to biological action, and (or) of bacteria, and (or) of an anti-toxic agent; (2) screening; (3) treatment in the presence of an accumulation of biological growths or sludge; and (4) aeration with accompanying sedimentation and decantation. As will be more fully described hereinafter, satisfactory treatment of certain sewages can, in many cases, be effected by omitting one or more of the aforementioned operations and the aforementioned combination of these four operations is to be understood as representing my preferred practice.

The improved method of the invention, in its complete aspect, will be explained in conjunction with the accompanying drawings, in which:

Figure 1 is a diagrammatic flow sheet of an arrangement of apparatus for carrying out the method of the invention;

Fig. 2 is a sectional elevation of another form of apparatus adapted for carrying out the aforementioned treatment of the sewage in the presence of an accumulation of biological sludge, and Fig. 3 is a sectional plan taken on the section line 3—3 of Fig. 2.

I have found that with a favorable environment a very effective biological clarification or treatment of sewage can be secured in the sewer itself while the sewage is flowing therethrough. Accordingly, the first operation in my preferred complete method of sewage treatment consists in subjecting the sewage while it is flowing through the sewer to favorable biological action. To this end, I have found that it is only necessary to create within the sewage as it flows through the sewer a favorable environment for the development of suitable biological growths. Usually, there will be present in the sewer bacteria in sufficient numbers or quantity for the purposes of the invention, but, where necessary, appropriate bacteria may be introduced into the sewer. Usually, I find it necessary to stimulate the growth of the bacteria by introducing into the sewage as it flows through the sewer one or more agents for stimulating the development of the favorable biological growths. Where the sewage is for any reason toxic, suitable anti-toxic agents may be introduced into the sewer for overcoming this condition. Thus, in accordance with this aspect of the present invention, I introduce into the sewage as it flows through the sewer one or more agents conducive to the maintenance within the sewage of a favorable environment for the development of appropriate biological growths for effecting the desired clarification or treatment of the sewage. As hereinbefore mentioned, these added agents may consist of appropriate stimulants for the proper development of the biological growths, or of appropriate bacteria, or of appropriate anti-toxic agents, or of two or all of such agents.

The introduction into the sewer of one or more of the aforementioned agents is effected as far as practicable from the sewer outlet, in order that the sewage may secure as complete a treatment as possible while flowing through the sewer. Sewer conduits or pipes are usually made of vitrified tile, brick, or the like, and, in the practice of the present invention, the biological growths adhere to and build up on the walls of the sewer. The biological growth is a gelatinous velvety mass possessing considerable coherence. This biological growth is continually developing and building up on the walls of the sewer and at the same time the flow of the sewage operates to continuously break off masses of this biological growth which thereupon commingle with the sewage and effectively assist in the biological clarification or treatment thereof. At the outlet of the sewer, appropriate means are established for collecting and removing the masses of biological growths suspended in the sewage, or for completing the biological treatment of the sewage, or for carrying out both of these steps, as the case may be.

In many cases, the sewage, after having been subjected while flowing through the sewer to the biological treatment contemplated by the present invention, need only be screened in order to complete the clarification or purification necessary. In these cases, the liquid which passes through the screen may be of a self-purifying character. That is to say, this screened liquid may contain favorable organisms in sufficient numbers or quantity to digest without nuisance the remaining organic matter present in the sewage liquid passing through the screen. Usually, however, the biological treatment of the sewage while flowing through the sewer is in the nature of a preparatory treatment and is to be followed by other operations for completing the purification of the sewage. Thus, in accordance with my preferred complete method of sewage treatment, the biologically treated sewage discharged from the sewer outlet is screened to remove therefrom the lumps or aggregates of biological growth and is then subjected to clarification or partial clarification in the presence of an accumulation of biological sludge. This biological sludge is generally of substantially the same character as the biological growths developed in the sewer, and similar addition agents may be made to the sewage when undergoing treatment in the presence of an accumulation of biological sludge as were added to the sewage while undergoing treatment in the sewer.

The treatment of the sewage in the presence of an accumulation of biological sludge is preferably conducted in relatively deep or tall tanks. The operation may be carried out as the final step in the treatment of the sewage or may be carried out as a preparatory step for a subsequent operation. Where the treatment of the sewage in the presence of an accumulation of biological sludge is the final step in the purification of the sewage, the operation is carried out in such a manner as to permit sedimentation of the sludge and decantation of a substantially clear effluent. In other words, the level of the sludge in the treatment tank is maintained sufficiently low, by withdrawing sludge from the lower part of the tank, to insure by decantation a substantially clear effluent. Where the sewage is to be subjected to further treatment, no sludge is withdrawn from the tank, but the sewage as a whole is permitted to overflow and is appropriately conducted to the next treatment operation.

In accordance with my preferred practice, the sewage after treatment in the presence of an accumulation of biological sludge is subjected to aeration in the presence of biological sludge, in substantially the same manner as in the activated sludge process of sewage treatment. In this operation, the purification and clarification of the sewage is completed, and two products are secured, a substantially clear and inocuous effluent and a biological sludge possessing valuable properties for the manufacture of fertilizers. If desired, the treatment of the sewage in the presence of an accumulation of bacterial sludge may follow instead of precede the aeration of the sewage in the presence of activated or biological sludge, in which event the treatment of the sewage in the presence of the accumulation of biological sludge is carried out as the final step in the treatment process as hereinbefore explained.

As hereinbefore explained, the additive agent or agents for maintaining within the sewage a favorable environment for the development of appropriate biological growths may be introduced into the sewage while it is flowing through the sewer or while undergoing treatment in the presence of an accumulation of biological sludge, or such agent or agents may be introduced at both stages in the treatment process. Moreover, if desired, such agent or agents may be introduced into the sewage while undergoing aeration in the presence of activated sludge. While the biological treatment of the sewage while flowing through the sewer and in the presence of an accumulation of biological sludge is conducted without aeration and without the artificial introduction of air into the sewage, whereas during the aeration of the sewage in the presence of activated sludge air bubbles are forcibly passed through the sewage, I have found that in each of these three treatment operations substantially similar conditions or environments are favorable to the development of appropriate biological growths for the clarification of the sewage. For this reason, the following discussion as to the nature and character of the agent or agents to be added to the sewage for the maintenance of a favorable environment for the development of appropriate biological growths is to be understood as applicable to any one of these treatment operations, although, as respects the present invention, more particularly applicable to the biological treatment of the sewage while flowing through the sewer or while contained in or flowing through a tank or other appropriate receptacle in the presence of an accumulation of biological sludge.

I have found that the production and maintenance of a particular range of alkalinity or basicity in the sewage is conducive to the growth of favorable biological organisms for clarification of the sewage. I have, moreover, found that the addition of certain metals or metallic compounds or salts to the sewage exercises a beneficial effect upon the growth and development of favorable biological organisms. In particular, I have found that metallic iron or certain compounds of iron such as iron hydroxid or carbonate of iron, or similar compounds of iron, when added to the sewage exercise a very beneficial effect in producing and maintaining a favorable environment for the development of the desired biological growths. Instead of the compounds of iron of the character just mentioned, I have found that similar compounds of other non-toxic metals may be added to the sewage with beneficial results. Thus, I may add to the sewage carbonates and hydroxids of manganese and the corresponding compounds of titanium, aluminum and other metals which belong to the group known as metals of the earth oxid group. In general, these compounds may be defined as insoluble hydroxids of a non-toxic metal or compounds of such metals capable of forming an insoluble hydroxid by treatment with water. By non-toxic I mean to define a metal or compound thereof which exercises no toxic effect upon the sewage. The insoluble hydroxid formed by treatment with water results from hydrolysis or hydrolytic dissociation in which the OH ion of the water combines with the metallic ion to form the insoluble hydroxid.

I have also found that the addition to the sewage of finely ground or colloidal mineral fertilizer materials, such as phosphate rock, green sand, and the like, assist in maintaining a condition which is favorable to the development of the desired biological growths, and at the same time, there is no loss of the fertilizer material itself, since this material is completely recovered in the final sludge and therefore adds to the marketable value of the sludge. I prefer to add these inorganic fertilizer materials to the sewage in a finely ground condition, as, for example, in the form of a powder which will pass a 300 mesh sieve. By selecting inorganic fertilizer material of proper density and by regulating the amount added to the sewage, I am able to increase and to control and regulate the mean or average density of the accumulated sludge, thereby rendering it more readily settleable and more easily dewatered and dried. Furthermore, the addition of fertilizer materials of this general character overcomes in a large measure the usual slimy character of the accumulated sludge, whereby the sludge can be more readily handled in its subsequent treatment.

Toxic conditions in the sewage may be satisfactorily overcome by the introduction into the sewage of appropriate anti-toxic agents. For example, where the sewage contains calcium hydrate which is injurious to certain favorable types of bacteria, such injurious effect may be overcome by the addition to the sewage of a bicarbonate, as, for instance, potassium bicarbonate; the resulting potassium carbonate being itself a stimulant to the growth of the favorable biological organisms and being recoverable, to a certain extent, in the bodies of the organisms themselves.

Another means which I employ for creating especially favorable conditions in the sewage for the growth of the desirable biological organisms consists in increasing the organic constituents of the sewage in respect to those materials which serve as food for these organisms during their growth. For example, I may add to the sewage certain trade waste liquors such as packing house effluents, or I may add waste vegetable products, such as sawdust, garbage or the like, or I may add the screenings obtained in the preliminary treatment of raw sewage in accordance with the process described in my pending patent application Serial No. 369,202, filed March 27, 1920. In addition to thus supplying more nutrient material for the development of the growing organisms, I also by this means combine a satisfactory disposal of sewage with a satisfactory disposal of garbage and at the same time I recover the fertilizer values of these various organic waste products in the accumulated sludge.

Another advantage of adding certain waste organic materials to the sewage lies in the favorable effect produced by certain insoluble cellular and fibrous constituents of these waste materials upon the porous character of the accumulated sludge, whereby the sludge is prevented from forming a compact mass upon settling, which cannot be readily dewatered especially by centrifugal treatment. Also, the presence of a limited amount of such cellular and fibrous material in the sludge imparts a more friable character to the dried product sludge, thus rendering the product more desirable for transportation and handling.

It will accordingly be understood that in my present process of sewage treatment, I maintain within the sewage conditions in respect to both the inorganic and organic constituents of the sewage which are favorable to the maximum activity of the desired biological organisms for effecting clarification of the sewage. On this account it is usually unnecessary in my present process of sewage treatment to inoculate the sewage with any particular organism. The important factor in the present process is the production and maintenance in the sewage of a suitable supply of inorganic and organic constituents thereby providing a favorable environment for the development of the desired biological growths. When these conditions are maintained in the sewage a biological flora or growth will usually develop in the sewage without inoculation which is best suited to survival in the particular sewage being treated and which is also best suited for the production of a satisfactory effluent and a marketable fertilizer sludge of relatively high nitrogen content.

While I do not attribute the advantageous results of my present process of treating sewage to the predominance of any particular organisms in the biological growth, I have found that the organisms *Bacillus crenothrix* and *vorticelli* are as a rule predominant, and, in general, it appears that an environment which is favorable to the growth and development of these bacilli will be found a favorable environment for the purposes of the present invention.

In the event that satisfactory organisms do not exist or develop in the sewage within a reasonable length of time in any of the aforementioned biological treatment operations, the sewage may be inoculated with organisms of the appropriate character for hastening the production of bacterial growths of satisfactory activity. But it is to be understood that such inoculation alone will not bring about the desirable results which the present invention contemplates. If the constituents of the sewage, especially as respects its limited degree of alkalinity and the presence of certain kinds of stimulating and nutrient constituents, are not appropriately maintained, the organism with which the sewage is inoculated may not persist as a predominant constituent of the biological growth and the activity of the biological growth may become greatly decreased.

Respecting the degree of alkalinity of the sewage as a whole which I prefer to employ in the practice of the invention, I have found that a sewage which contains about 200 parts per million of base calculated as calcium carbonate, and using methyl orange indicator in determining the neutral point, is a favorable medium in which to maintain the activity of the biological growth at a maximum value. However, I have found that the nature of the base present in the sewage exercises an important influence upon the activity of the biological growth. Thus, if the 200 parts per million of base mentioned above are composed entirely of sodium hydroxid or similar alkali metal hydroxid, or alkaline earth hydroxid, the results obtained are not so satisfactory as they would be if the entire alkalinity is due to the presence of a weak basic material alone, such as calcium carbonate, or the like. In other words, I prefer that the sewage shall have a hydroxyl ion concentration varying between about $1 \times 10^{-9}$ and $1 \times 10^{-3}$ normality, taking $1 \times 10^{-7}$ as the hydroxyl ion concentration of pure neutral water. This means, of course, that the sewage may vary from very slightly acid to slightly alkaline, taking pure water as the standard of neutrality.

Referring now to Fig. 1 of the accompanying drawings, there is diagrammatically represented a flow sheet indicating a procedure and an appropriate apparatus for practising the preferred and complete method of sewage treatment contemplated by the present invention. In this figure I have represented three sewers 5 discharging into a main sewer conduit 6. At appropriate points 7 provision is made for introducing into the sewers 5 any one or more of the addition agents hereinbefore described. Preferably, the points 7 are as far as practicable removed from the outlet of the sewer main 6 so that the sewage may secure as complete treatment as possible while flowing through the sewers 5 and 6. Within the sewers 5 and 6 the biological treatment and clarification of the sewage proceeds as hereinbefore described. Gelatinous velvety masses or aggregates of biological growths develop on the walls of the sewer and are from time to time broken off by the passage of the sewage and commingle therewith. As the sewage flows along, large numbers of these aggregates of such biological growths become mixed with and flow along with the sewage. Obviously, the longer this biological treatment can be continued the more complete will be the clarification of the sewage. For this reason, it is desirable that the biological treatment be initiated as far as practicable from the sewer outlet. The introduction of addition agents into the sewer may take place at various points along the length of the sewer, the idea being in all cases to provide throughout the entire length of the sewer a favorable environment for the maintenance and development of the biological growths necessary for effecting the desired treatment of the sewage while flowing through the sewer.

Following the biological treatment of the sewage in the sewer conduits, the sewage is subjected to a screening operation in order to remove therefrom the aggregates of biological growths which have collected therein during the aforementioned treatment. A hollow rotating cylindrical screen of the construction illustrated in Fig. 1 of the drawings is admirably adapted for carrying out this screening operation, but it will, of course, be understood that other types of screening apparatus may be employed if desired. The screening apparatus, illustrated in Fig. 1 comprises a screening chamber 11 into which the sewage is conducted from the outlet of the sewer 6. A cylindrical screen 12 is rotatably mounted in the screening chamber 11. The screen has two circular ends 13 and 14, the latter having an axial outlet 20 for the discharge of screened liquor into a compartment 15. The screening medium may advantageously be a wire screen of 25 gage wire with 20 to 24 meshes to the inch. The screen may be rotated by means of a pulley 16 from any suitable power source, and in practice, I have found a peripheral speed of about 200 to 300 feet per minute well adapted for the screening operation in hand.

A transverse baffle or lifting member 17 is preferably secured to the face of the rotary screen, and serves to lift the aggregates of bacterial growth in the sewage upwardly, on the ascending side of the screen, and thereby assists the discharge of such aggregates into an appropriate sludge-collecting compartment 19. The lifting member 17 projects about one inch from the external periphery of the screening drum. In the accompanying drawings, the sludge-collecting compartment 19 is represented in the form of a trough from which the sludge may be removed in any appropriate manner, as, for example, by a manually removable cage or perforated basket, or continuously by a bucket elevator or similar elevating means.

In operation, the sewage from the sewer outlet 6 is continuously fed into the screening compartment 11, and screened liquor is continuously discharged through the axial outlet 20 of the screening drum into the compartment 15. In certain instances, this screened liquor may be directly discharged into rivers or streams, for example, where it is of a self purifying character. In most cases, however, it will be desirable, if not necessary, to subject this screened liquor to further treatment. The biological sludge collecting in the compartment 19 may be subjected to any appropriate subsequent treatment, and is valuable as a constituent in the manufacture of fertilizer. Where it is necessary to inoculate the sewage flowing through the sewers 5 with bacteria, a portion of this biological sludge may be used for the purpose, being introduced into the sewers at the points 7.

In accordance with my preferred practice, the screened liquor from the screening operation is next subjected to biological treatment in the presence of an accumulation of biological growths or sludge. I prefer to conduct this operation in a relatively deep tank into which the screened liquor is introduced near the bottom thereof by a slowly rotating horizontal pipe. The tank is of sufficient depth to permit of undisturbed sedimentation in the upper portion thereof and the screened liquor is introduced beneath the accumulation of biological sludge in the tank. An appropriate apparatus for carrying out this operation is illustrated in Fig. 1 of the drawings.

The digesting tank 21, in which the screened liquor is subjected to biological treatment in the presence of an accumulation of biological sludge, is relatively deep compared with its diameter, for example, these dimensions may be in the ratio of 10 feet deep and 6 feet in diameter. A centrally disposed shaft 22 is rotatably mounted within the tank 21 and carries at its upper end a feeding well 23 into which the screened liquid from the compartment 15 of the screening apparatus is introduced through a conduit 24. A depending pipe 25 is carried by and communicates with the well 23 and has at its lower end in proximity to the bottom of the tank 21 a radially disposed member 26 suitably perforated to permit the discharge of the screened liquor into the bottom of the tank 21. The shaft 22 carries near its bottom a radially disposed arm 27 to which are secured plows or rakes 28. The liquid discharge member 26 and the rakes 28 are arranged on diametrically opposite sides of the shaft 22, and as the shaft is slowly rotated the screened liquid is distributed around the bottom of the tank 21 and settleable solid matter is kept in sufficient motion to prevent the formation of any septic regions in the tank. A chain 32 and idler plow are preferably associated with the rakes 28 for more effectively preventing the formation of any septic regions on the bottom or in the corners of the tank 21. The arrangement and operation of this chain and idler plow will be explained in connection with Fig. 3 of the accompanying drawings.

Where the treatment in the digesting tank 21 is to be the final step in the treatment of the sewage, the operation is so conducted that the biological sludge level in this tank is approximately at such a height as is represented by the dotted line $a$. The tank is provided with an appropriately controlled outlet 29 a short distance below the level ($a$) of the sludge, and by appropriately controlling the discharge of sludge through the outlet 29 the sludge level within the tank may be maintained at the desired height and a substantially clear effluent may be withdrawn from the overflow launder 30, at the top of the tank. A sand hutch or blow-off 31 is provided in the bottom of the tank 21 for the discharge of sand or other coarse solids heavier than the liquid contents of the tank.

In Figs. 2 and 3 of the drawings, I have illustrated a modified construction of digesting tank which is particularly adapted for use where any loss in hydrostatic head of the sewage is to be avoided. The tank 21' is of the same general character as the tank 21 and has a centrally disposed rotatable shaft 22'. Near its lower end, this shaft carries a liquid distributer 26' and an arm 27' to which are secured plows or rakes 28'. The sewage to be treated is fed into the distributer 26' from beneath the bottom of the tank 21' by means of a pipe 25'. Appropriate connection is made between the end of the stationary pipe 25' and the distributer 26' to permit the rotation of the latter.

A chain 32 is secured to the outer and inner ends of the arm 27', and, in the rotation of the arm 27', drags behind the arm and over the bottom of the tank 21'. A plow 33 is attached to the outer end of the arm 27' by means of a chain 34. The face of the plow 33 in contact with the wall of the tank 21' is shorter than the other face of the plow, whereby as the plow is dragged along by the chain 34 it scrapes the corner of the tank and prevents the formation of any septic spots or regions. In a tank 50 in diameter, I have secured excellent results with a plow 6 inches in height with its shorter face 12 inches long and its other face 24 inches long, and secured to the arm 27' by a chain 12 to 18 inches in length. In such a tank, the distributer and rake may advantageously be rotated at a speed in the neighborhood of one-thirtieth R. P. M.

Where the sewage is subjected to aeration in the presence of biological sludge after treatment in the aforementioned digesting tank, the valve 29 of this tank is closed, so that the overflow from the tank consists of a mixture of sludge and liquid. Thus, such an amount of material is overflowed from the digesting tank as corresponds with the raw material fed into this tank and this withdrawn material is conducted to the aeration tank for subsequent treatment.

The aeration tank, as illustrated in Fig. 1, is substantially circular in section and comprises a cylindrical wall 35 and a substantially flat bottom 40. The bottom of the tank is provided with appropriate means for the introduction into the tank of air in a finely disseminated state. To this end appropriate air compartments 36 are provided in the bottom of the tank and these compartments are covered over or closed by a porous medium 37 which will permit the passage therethrough of air under pressure but which, under the operating conditions, does not permit the passage of liquid. I have found filtros tile satisfactory in the construction of the porous bottom or medium of the aeration tank, but other materials are available for this purpose.

A transverse tray or shelf 38, of annular configuration, is arranged intermediate the top and bottom of the tank. This tray slopes from the center toward the periphery of the tank and is provided at its outer edge with a plurality of downcast wells 39 communicating with the aeration chamber provided between the bottom 40 of the tank and the tray 38. The downcast wells 39 extend into troughs 41, thereby providing a seal which prevents the escape of air upwardly through the wells 39.

A rotating mechanism is operatively suspended within the tank and comprises a vertically disposed shaft 42 mounted in suitable bearings carried by a superstructure (not shown). The rotating mechanism has two sets of radially disposed arms 43 and 44. A series of plows or scrapers 45 are secured to each of the arms 43 and 44 and are arranged to move settled solid matter from the center of the tank toward the periphery. The plows 45 attached to the radial arms 43 are disposed in operative relation with the bottom 40 of the tank while the plows 45 attached to the radial arms 44 are disposed in operative relation to the top surface of the tray 38.

The inclined tray 38 divides the tank transversely into a lower aeration chamber and an upper sedimentation and decantation chamber. The incoming sewage is fed into the aeration chamber from the launder 30 through an inlet pipe 46. The inlet pipe 46 is arranged to discharge the incoming sewage tangentially across the bottom of the aeration chamber. A sump 47 is provided in the bottom 40 of the tank for the collection of solid substances of a nature unfitted for circulation with the sludge and sewage. An appropriately valved outlet pipe 48 communicates with this sump 47.

A cylindrical pipe or tube 49 surrounds the shaft 42 of the rotating mechanism and is secured thereto. The pipe 49 extends from near the top of the tank into proximity with the bottom thereof and serves as the downcast well in which the circulating liquor flows downwardy, as will be more fully described hereinafter. Surrounding the upper portion of the pipe 49 is a cylindrical pipe or well 50. In the apparatus illustrated in the drawings, the pipe 50 is integral with the tray 38 and extends upwardly from the central opening in this tray to approximately the same level as the top of the pipe 49. The concentric pipes 49 and 50 are separated by an appropriate space which serves as the upcast well for the circulating liquor. The top of the pipe 50 is provided with an adjustable overflow lip 51, so that the effective height of this pipe with respect to the pipe 49 may be adjusted.

The pipe 50 is surrounded by a cylindrical baffle 52 appropriately spaced therefrom and secured to the rotating mechanism. The baffle 52 extends downwardly from an appropriate distance above the top of the pipe 50 into proximity with the tray 38 and serves the double function of preventing splashing over of the liquid escaping from the circuit and of conducting this escaping liquid in a comparatively quiet manner into the sedimentation and decantation chamber.

The arrangement of the pipes 49, 50 and 52 provides three passages for the flow of liquid. The pipes 49 and 50 provide a circuit for the circulation of the liquid in the aeration compartment while the pipes 50 and 52 provide a passage for the escape of a certain small fraction of the circulating liquid into the sedimentation and decantation chamber. In the aeration chamber, the sewage is subjected to the elevating action of the finely disseminated air introduced into the liquid through the porous bottom. By the elevating or air lifting action of the finely disseminated air, a circulation of the sewage is maintained upwardly through the passage provided between the pipes 49 and 50 and downwardly through the pipe 49. The top of the pipe 49 is slightly lower, for example, one inch or so, than the top of the overflow lip 51 of the pipe 52, so that a very considerable portion of the liquid flowing upwardly through the annular passage between the two inner pipes 49 and 50 is returned to the aeration chamber.

A certain percentage of the liquid passing upwardly through the annular passage between the pipes 49 and 50 escapes over the lip of the pipe 50 and flows down through the passage provided between the pipes 50 and 52 into a body of similarly treated liquid undergoing sedimentation and decantation in the upper settling chamber of the tank. Sedimentation or settling takes place in the region of the tank above the intermediate tray 38 and outside the pipe 52. A certain amount of the liquid in this settling chamber returns to the aeration chamber through the downcast wells 39, and a certain amount of the liquor in the settling chamber is withdrawn by decantation into a peripheral launder 53.

The aeration of the sewage is conducted in the presence of an appropriate amount of biological growth, as in the well known activated sludge process of sewage treatment. The biological sludge is permitted to settle in the sedimentation and decantation chamber and an appropriate amount of the settled sludge is withdrawn through the sludge discharge pipe 54. A substantially clear effluent is withdrawn through the peripheral launder 53 and run to waste, or, if desired, this effluent may be subjected to appropriate treatment for the recovery of such valuable substances as it may contain in solution.

As previously stated, in carrying out the present invention, the aeration treatment of the sewage may precede the treatment in the aforementioned digesting tank. Where the treatment of the sewage in the digesting tank is the final step in the complete process, it may be necessary to aerate both the effluent and the sludge resulting from this treatment. The treatment of the sewage without artificial aeration in the presence of an accumulation of biological sludge depletes the sewage of air. The discharge into streams or rivers of an effluent which is thus depleted of or deficient in air is objectionable since it is injurious to the life of fish and the like. Moreover, sludge which is lacking in oxygen is difficult to filter-press. For these reasons, it is generally advisable to aerate both the effluent and the sludge where the treatment in the aforementioned digesting tank is the last step in the sewage purification.

In the treatment of the sewage in the presence of an accumulation of biological sludge without artificial aeration, it is very important that adequate precautions be taken to prevent any portions or regions of the sewage becoming septic. A septic condition in the sewage destroys the biological life which it is the purpose of the present invention to produce and maintain for the treatment of the sewage. For this reason, the sewage in the digestion tank should be kept in sufficient motion to prevent the formation of any septic regions. Such agitation as hereinbefore described has been found adequate for this purpose, and the chain and plow arrangement hereinbefore described have proved very effective in preventing the occurrence of septic conditions on the bottom and in the corner of the digestion tank. The purpose of the agitation in the digestion tank is merely to bring the sewage into intimate contact with the biological growths and to prevent the occurrence of any septic condition in this tank.

I claim:

1. The method of treating sewage which comprises subjecting the sewage to biological action in the presence of biological growths favorable to the clarification of the sewage, adjusting the hydroxyl-ion concentration of the sewage to a value between about $1 \times 10^{-3}$ and $1 \times 10^{-9}$, and maintaining within the sewage a favorable environment for such biological action by introducing into the sewage undergoing treatment one or more agents conducive to the development of said favorable environment.

2. The method of treating sewage which comprises subjecting the sewage to biological action in the presence of biological growths favorable to the clarification of the sewage, and maintaining within the sewage a favorable environment for such biological action by introducing into the sewage a relatively insoluble hydroxid of a non-toxic metal or compound of such metal capable of forming an insoluble hydroxid by treatment with water.

3. The method of treating sewage which comprises subjecting the sewage to biological action in the presence of biological growths favorable to the clarification of the sewage, and maintaining within the sewage a favorable environment for such biological action by introducing into the sewage undergoing treatment a compound of iron conducive to the development of said favorable environment.

4. The method of treating sewage which comprises subjecting the sewage to biological action in the presence of biological growths favorable to the clarification of the sewage, and maintaining within the sewage a favorable environment for such biological action by introducing into the sewage undergoing treatment a compound of iron which upon treatment with water forms hydroxid of iron.

5. The method of treating sewage which comprises passing the sewage through a conduit of considerable length and in which there are present biological growths favorable to the clarification of the sewage, and stimulating the development of said biological growths by the addition to the sewage as it flows through said conduit of one or more agents conducive to the maintenance of a favorable environment for the development of said biological growths.

6. The method of treating sewage which comprises subjecting the sewage while flowing through a sewer to biological action, and maintaining within the sewage a favorable environment for such biological action by introducing into the sewage as it flows through the sewer one or more agents conducive to the development of said favorable environment.

7. The method of treating sewage which comprises passing the sewage through a conduit of considerable length and in which there are present biological growths favorable to the clarification of the sewage, and stimulating the development of said biological growths by the addition to the sewage as it flows through said conduit of a relatively insoluble hydroxid of a non-toxic metal or a compound of such metal capable of forming an insoluble hydroxid by treatment with water.

8. The method of treating sewage which comprises passing the sewage through a conduit of considerable length and in which there are present biological growths favorable to the clarification of the sewage, and stimulating the development of said biological growths by the addition to the sewage as it flows through said conduit of a compound of iron which upon treatment with water forms hydroxid of iron.

9. The method of treating sewage which comprises subjecting the sewage to biological action in the presence of biological growths favorable to the clarification of the sewage, maintaining within the sewage a favorable environment for such biological action by introducing into the sewage undergoing treatment one or more agents conducive to the development of such favorable environment, and subjecting the thus treated sewage to a screening operation for removing therefrom the aggregates of biological growth collecting therein during said biological action.

10. The method of treating sewage which comprises passing the sewage through a sewer conduit of considerable length and in which there are present biological growths favorable to the clarification of the sewage, maintaining within the sewage a favorable environment for such biological action by introducing into the sewage as it flows through the sewer conduit one or more agents conducive to the development of said favorable environment, and subjecting the thus treated sewage to a screening operation for removing therefrom the aggregates of biological growth collecting therein during said biological action.

11. The method of treating sewage which comprises introducing the sewage near the bottom of a mass of sewage undergoing treatment and containing an accumulation of biological sludge, withdrawing the treated sewage in whole or in part from near the top of said mass, and providing within said mass of sewage sufficient motion to prevent the formation of septic regions.

12. The method of treating sewage which comprises subjecting the sewage to biological action in the presence of an accumulation of biological growths, introducing the sewage to be thus treated beneath said accumulation of biological growths, and withdrawing the treated sewage from above said accumulation of biological growths, whereby the sewage in the course of its treatment passes upwardly and in intimate contact with said accumulation of biological growths.

13. The method of treating sewage which comprises subjecting the sewage to biological action in the presence of an accumulation of biological growths, introducing the sewage to be thus treated beneath said accumulation of biological growths and passing the sewage in the course of its treatment upwardly through and in intimate contact with said accumulation of biological growths, and providing within the mass of sewage undergoing treatment sufficient motion to prevent the formation of septic regions.

14. The method of treating sewage which comprises subjecting the sewage to biological action in the presence of an accumulation of biological growths, introducing the sewage to be thus treated beneath said accumulation of biological growths and passing the sewage in the course of its treatment upwardly through and in intimate contact with said accumulation of biological growths, and aerating the product or products resulting from the aforementioned treatment.

15. The method of treating sewage which comprises subjecting the sewage to biological action in the presence of an accumulation of biological growths, introducing the sewage to be thus treated beneath said accumulation of biological growths and passing the sewage in the course of its treatment upwardly through and in intimate contact with said accumulation of biological growths, and maintaining within the sewage undergoing treatment a favorable environment for such biological action by introducing into the sewage one or more agents conducive to the development of said favorable environment.

16. The method of treating sewage which comprises passing the sewage through a conduit of considerable length and in which there are present biological growths favorable to the clarification of the sewage, maintaining within the sewage a favorable environment for such biological action by introducing into the sewage as it flows through the sewer conduit one or more agents conducive to the development of said favorable environment, screening the thus-treated sewage and thereby obtaining a biological sludge and a screened liquid, and subjecting said screened liquid to two succeeding treatment operations in the presence of biological growths in one of which the sewage is artificially aerated and in the other of which there is no artificial aeration but the sewage is kept in sufficient motion to prevent the formation of septic regions.

17. The method of treating sewage which comprises passing the sewage through a conduit of considerable length and in which there are present biological growths favorable to the clarification of the sewage, and subjecting the sewage after the foregoing treatment and with or without a preliminary screening operation to biological action in the presence of an accumulation of biological growths, introducing the sewage for said last mentioned treatment beneath said accumulation of biological growths and passing the sewage upwardly through and in intimate contact with said accumulation of biological growths, and providing within the sewage during the last mentioned treatment sufficient motion to prevent the formation of septic regions.

18. The method of treating sewage which comprises passing the sewage through a conduit of considerable length and in which there are present biological growths favorable to the clarification of the sewage, maintaining within the sewage a favorable environment for such biological action by introducing into the sewage as it flows through said conduit one or more agents conducive to the development of said favorable environment, and subsequently subjecting the sewage to artificial aeration in the presence of biological growths.

19. The method of treating sewage which comprises passing the sewage through a conduit of considerable length and in which there are present biological growths favorable to the clarification of the sewage, maintaining within the sewage a favorable environment for such biological action by introducing into the sewage as it flows through said conduit one or more agents conducive to the development of said favorable environment, and subsequently subjecting the sewage to biological action in the presence of an accumulation of biological growths in the course of which the sewage is introduced beneath said accumulation of biological growths and passes upwardly through and in intimate contact with said accumulation of biological growths.

20. The method of treating sewage which comprises subjecting the sewage to biological action in the presence of an accumulation of biological growths, introducing the sewage beneath said accumulation of biological growths and passing the sewage upwardly through and in intimate contact with said accumulation of biological growths, and subsequently subjecting the sewage to artificial aeration in the presence of biological growths favorable to the clarification of the sewage.

21. The method of treating sewage which comprises subjecting the sewage to two treatment operations in one of which the sewage is artificially aerated in the presence of biological growths favorable to the clarification of the sewage and in the other of which the sewage is subjected to biological action in the presence of an accumulation of biological growths but without artificial aeration and in the course of which the sewage is introduced beneath said accumulation of biological growths and passes upwardly through and in intimate contact with said accumulation of biological growths.

22. The method of treating sewage which comprises passing the sewage through a conduit of considerable length and in which there are present biological growths favorable to the clarification of the sewage, and subsequently subjecting the sewage with or without a preparatory screening operation to two succeeding treatment operations in the presence of biological growths favorable to the clarification of the sewage, in one of which treatment operations the sewage is artificially aerated and in the other of which treatment operations the sewage to be treated is introduced beneath an accumulation of biological growths and passes upwardly through and in intimate contact therewith and in which the sewage is kept in sufficient motion without artificial aeration to prevent the formation of septic regions.

23. The method of treating sewage which comprises subjecting the sewage while flowing through a sewer to biological action, maintaining within the sewage a favorable environment for such biological action by introducing into the sewage as it flows through the sewer one or more agents conducive to the development of said favorable environment, subjecting the thus treated sewage to a screening operation for removing therefrom the aggregates of biological growth collecting therein during the aforementioned biological action, subjecting the screened liquid from the aforementioned operation to biological action in the presence of an accumulation of biological growths in the course of which the sewage is introduced beneath said accumulation of biological growths and passes upwardly through and in intimate contact therewith and in which the sewage is kept in sufficient motion without artificial aeration to prevent the formation of septic regions, and subsequently subjecting the sewage to artificial aeration in the presence of biological growths favorable to the clarification of the sewage.

24. The method of treating sewage which comprises subjecting the sewage to biological action in the presence of an accumulation of biological growths favorable to the clarification of the sewage in the course of which the sewage is introduced beneath said accumulation of biological growths and passes upwardly through and in intimate contact therewith and in which the sewage is kept in sufficient motion without artificial aeration to prevent the formation of septic regions.

25. The method of treating sewage which comprises subjecting the sewage to biological action in the presence of an accumulation of biological growths favorable to the clarification of the sewage in the course of which the sewage is introduced beneath said accumulation of biological growths and passes upwardly through and in intimate contact therewith and in which the sewage is kept in sufficient motion without artificial aeration to prevent the formation of septic regions, and subsequently subjecting the product or products of the aforementioned treatment operation to aeration.

26. The method of treating sewage which comprises subjecting the sewage to biological action in the presence of an accumulation of biological growths favorable to the clarification of the sewage in the course of which the sewage is introduced beneath said accumulation of biological growths and passes upwardly through and in intimate contact therewith and in which the sewage is kept in sufficient motion without artificial aeration to prevent the formation of septic regions, and subsequently subjecting the sewage to artificial aeration in the presence of activated sludge.

27. The method of treating sewage which comprises passing the sewage through a conduit of considerable length and in which there are present biological growths favorable to the clarification of the sewage, subsequently subjecting the sewage to biological action in the presence of an accumulation of biological growths favorable to the clarification of the sewage in the course of which the sewage is introduced beneath said accumulation of biological growths and passes upwardly through and in intimate contact therewith, and stimulating the development of said biological growths in either or both of the aforementioned treatments by introducing into the sewage undergoing treatment one or more agents conducive to the maintenance of a favorable environment for the development of said biological growths.

In testimony whereof I affix my signature.

CHARLES LEE PECK.